T. F. PHILIPPI.
MACHINING APPARATUS.
APPLICATION FILED JUNE 22, 1916.
1,219,038.
Patented Mar. 13, 1917.
4 SHEETS—SHEET 1.
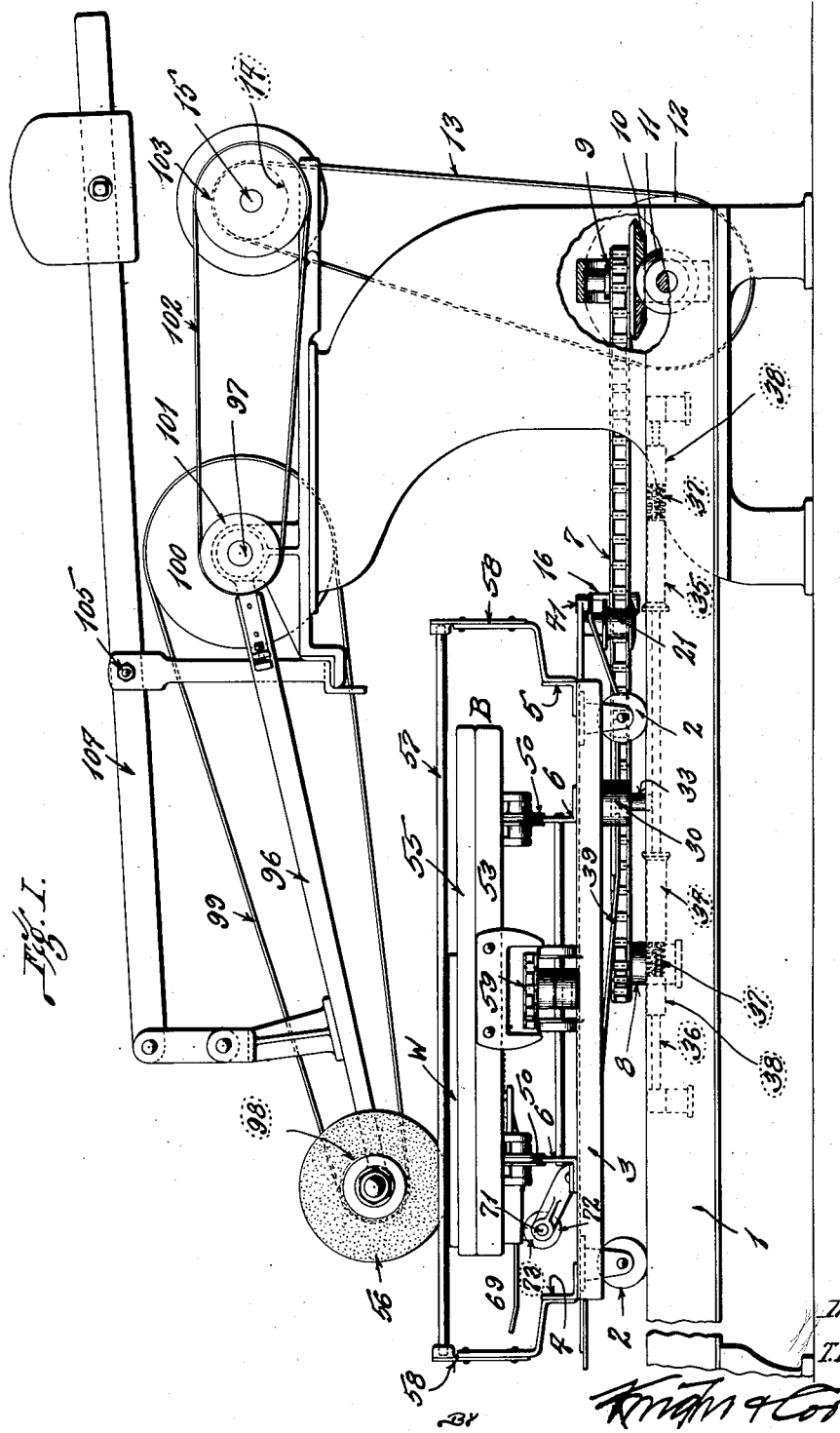

T. F. PHILIPPI.
MACHINING APPARATUS.
APPLICATION FILED JUNE 22, 1916.
1,219,038.
Patented Mar. 13, 1917.
4 SHEETS—SHEET 2.
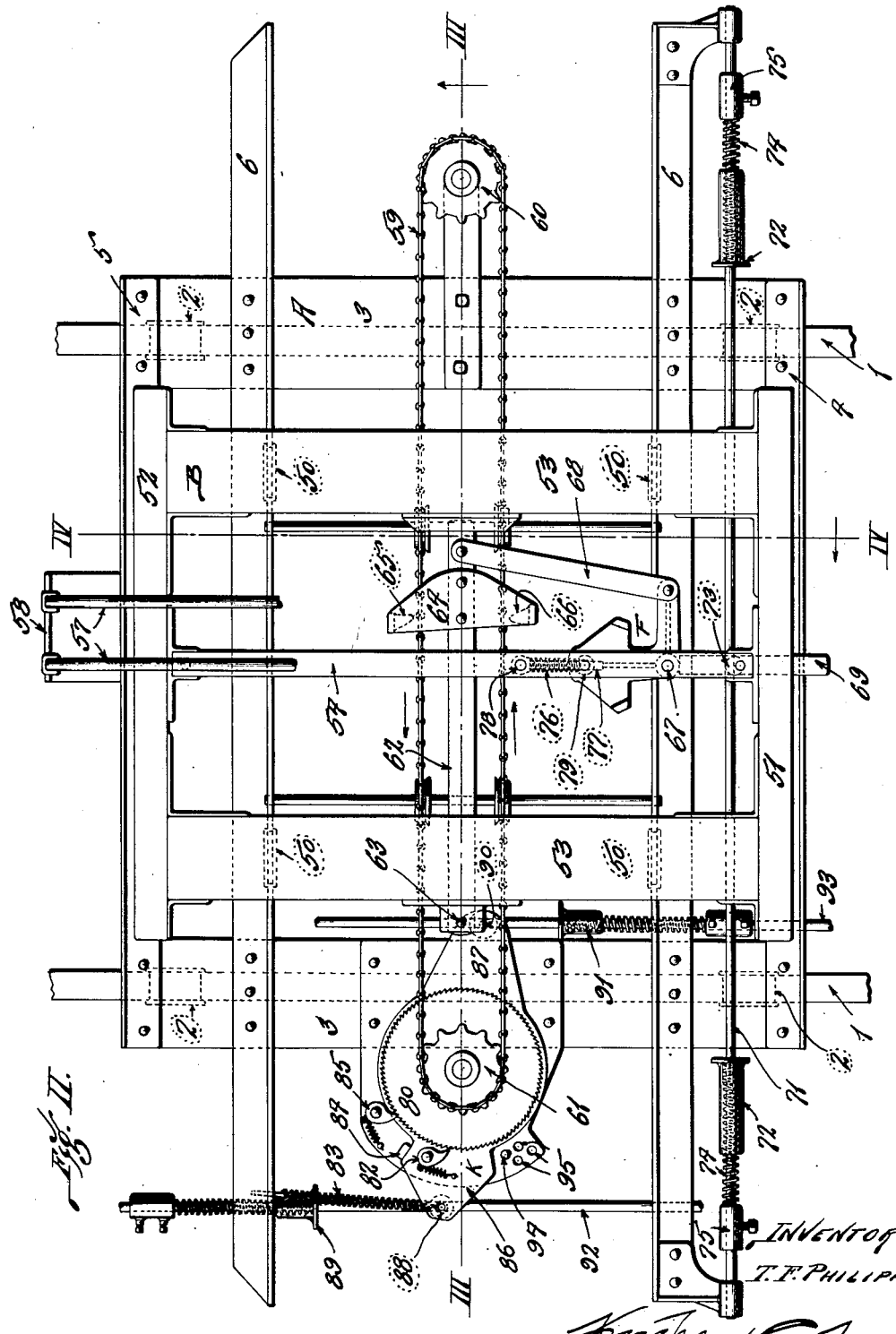
INVENTOR:
T. F. PHILIPPI,

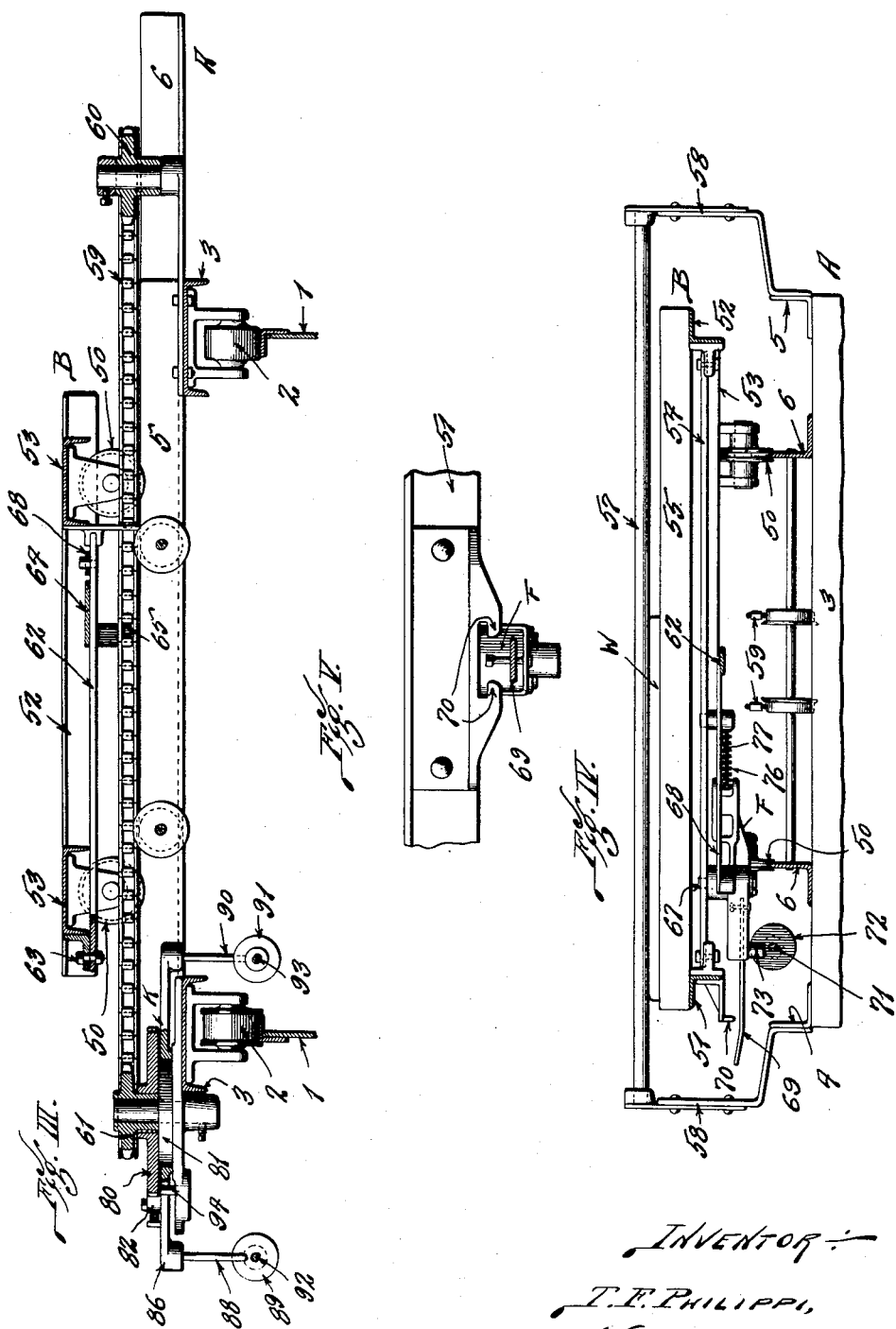

T. F. PHILIPPI.
MACHINING APPARATUS.
APPLICATION FILED JUNE 22, 1916.
1,219,038.
Patented Mar. 13, 1917.
4 SHEETS—SHEET 4.
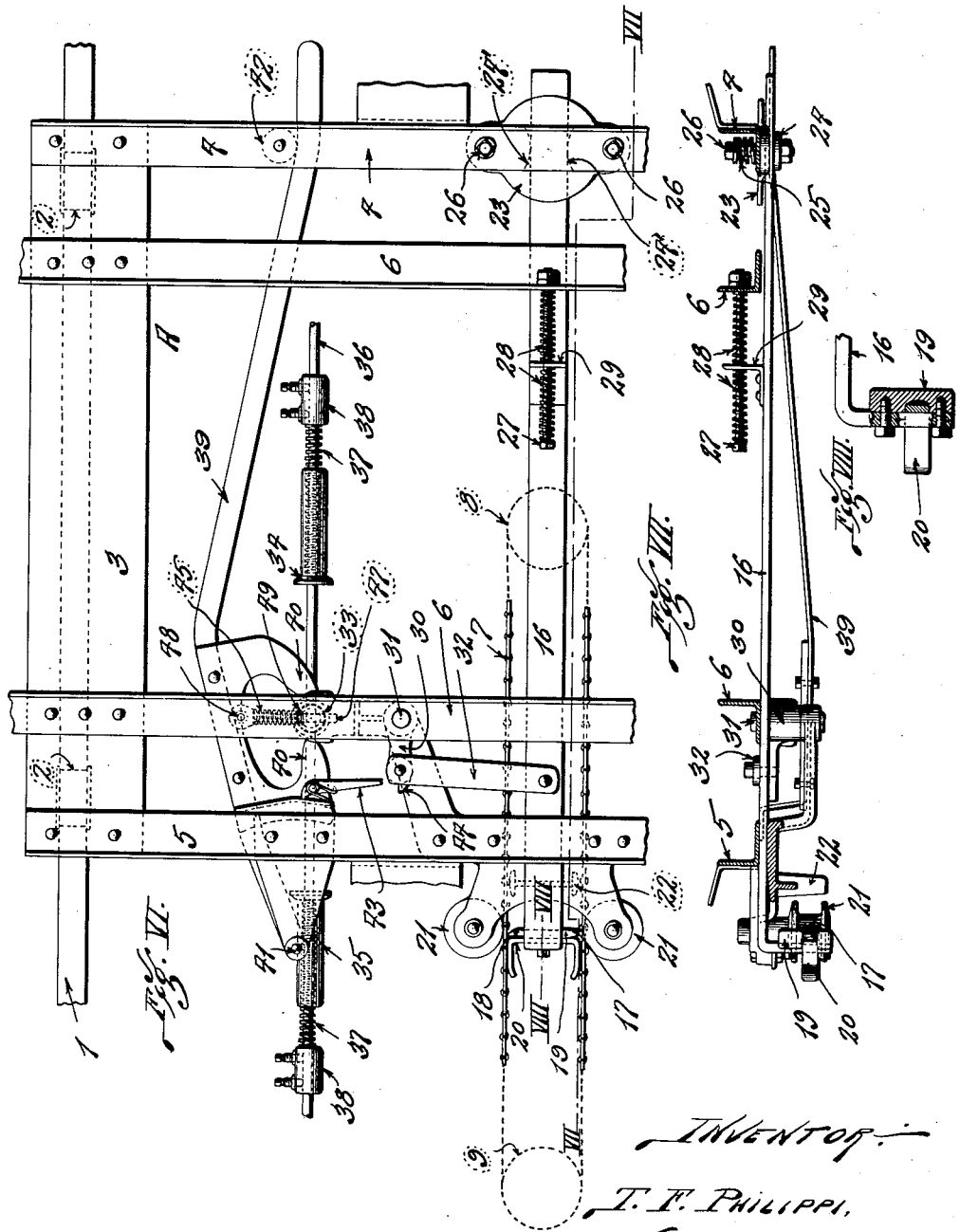
INVENTOR
T. F. Philippi,
BY Knight Cook attys.

UNITED STATES PATENT OFFICE.

THEODORE F. PHILIPPI, OF EAST ST. LOUIS, ILLINOIS.

MACHINING APPARATUS.

1,219,038.  Specification of Letters Patent.  Patented Mar. 13, 1917.

Application filed June 22, 1916. Serial No. 105,169.

*To all whom it may concern:*

Be it known that I, THEODORE F. PHILIPPI, a citizen of the United States of America, a resident of the city of East St. Louis, in the county of St. Clair, State of Illinois, have invented certain new and useful Improvements in Machining Apparatus, of which the following is a full, clear, and exact description, reference being had to the accompanying drawings, forming a part of this specification.

My invention relates to certain improvements particularly adapted for use in machines having reciprocating carriages. One of the objects of the invention is to provide a simple and efficient means for reciprocating a work supporting carriage, and this object is preferably attained by an endless belt or chain which travels continuously in an endless path, said belt or chain being arranged to form two strands which travel continuously in opposite directions, and means for engaging said strands alternately to impart a reciprocating movement to the carriage. Another object is to produce a machine having a work holding carriage supported by another carriage, the track of one carriage being at an angle to the track of the other carriage, so that the work may be moved back and forth and shifted transversely at the end of each stroke of one of the carriages.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a side elevation of a machine embodying the features of my invention.

Fig. II is a fragmentary top or plan view illustrating two carriages and the driving mechanism for the upper carriage.

Fig. III is a horizontal section taken approximately on line III—III, Fig. II.

Fig. IV is a horizontal section taken approximately on line IV—IV, Fig. II.

Fig. V is a detail view showing a portion of the reversing device of the upper carriage, and the means for retaining the reversing device in a neutral position.

Fig. VI is a fragmentary view showing the driving mechanism of the lower carriage.

Fig. VII is a horizontal section taken approximately on line VII—VII, Fig. VI.

Fig. VIII is an enlarged section on the line VIII—VIII, Fig. VI.

Briefly stated, the machine I have shown to illustrate the preferred form of the invention, is a machine for grinding flat or slightly curved surfaces, the work being mounted upon a work holding carriage which travels upon a supporting carriage. The track of one carriage lies at a right angle to the track of the other carriage, and the supporting carriage is reciprocated constantly, while the work holding carriage advances step by step in response to each stroke of the supporting carriage. The work is thus carried back and forth under a grinding or polishing wheel and also advanced transversely so as to expose the entire surface of the work to the action of the grinding or polishing wheel.

The main frame of the machine comprises a pair of stationary tracks 1 arranged to receive the wheels 2 of a lower carriage A which I will term a supporting carriage for the reason that it supports a work holding carriage B. The frame of the supporting carriage comprises side bars 3 to which the bearings for the wheels 2 are secured, and front and rear bars 4 and 5 connecting said side bars 3. The supporting carriage is also provided with a pair of tracks 6 arranged at right angles to the tracks 1 and constituting supports for the work holding carriage B.

The means for reciprocating the supporting carriage comprises an endless link belt 7 (Figs. I and VI) fitted to an idle wheel 8 and a drive wheel 9. These wheels are mounted in stationary bearings, and the drive wheel 9 is driven continuously in one direction through the medium of a bevel gear 10 fixed to said drive wheel (Fig. I), a pinion 11 meshing with said wheel 10, a pulley 12 secured to the shaft on which the pinion is mounted, a belt 13 fitted to the pulley 12, and a pulley 14 for transmitting power from a power shaft 15 to the elements just described. The link belt 7 travels continuously in an endless path, and it is arranged to form two belt strands (Fig. VI) which travel continuously in opposite directions. The means for transmitting movement from the belt 7 to the carriage A comprises an oscillatory transmission arm 16 having a pair of teeth 17 and 18 (Figs. VI and VII), each of which is adapted to interlock with one of the oppositely moving strands of the link belt 7. When the transmission device occupies the neutral position shown in Fig. VI, the teeth 17 and 18 are both disengaged from the link belt 7 and the latter will travel without imparting movement to the carriage A. However, the transmission arm 16 carried by the carriage A, may be shifted to interlock either of the teeth with the link belt 7, and this arm is shifted automatically so that the carriage A will reciprocate in response to the continuous movement of the belt 7. Obviously, this result can be obtained by alternately engaging the teeth 17 and 18 with the link belt.

The teeth 17 and 18 are formed at the ends of a block 19, the latter being rigidly secured to the downturned end of arm 16, as shown most clearly in Fig. VIII. A U-shaped belt retaining device 20, loosely supported between the block 19 and the downturned end of arm 16 (Figs. VI and VIII), engages the oppositely moving strands of the belt 7 at points adjacent to the teeth 17 and 18 so as to insure the withdrawal of said teeth from the belt in response to movement of the arm 16. Rollers 21, located on opposite sides of the belt 7, prevent said belt from moving outwardly when the teeth 17 and 18 are forced into the links of the belt. Arms 22, depending from the carriage A, form part of the means for retaining the belt in position.

To avoid undue shocks, which would otherwise occur when the transmission arm 16 is shifted to reverse the movement of carriage A, said arm is supported between a friction plate 23 and a pressure bar 24, both of which are carried by the carriage A. The friction plate 23 is provided with curved faces 24' (Fig. VI) adapted to engage the opposite edges of the transmission arm 16, and allowing said arm to swing in an arc of a circle. The pressure bar 24 (Fig. VII) is forced into engagement with the bottom face of the arm 16, by means of springs 25 surrounding bolts 26 (Fig. VI) which pass through the friction plate 23 and also through the pressure bar 24. The transmission arm 16 is also yieldingly secured to the carriage A by means of a long bolt 27 (Figs. VI and VII), and springs 28 surrounding said bolt. The bolt 27 is secured to one of the members 6 of the carriage A, and the springs 28 lie on opposite sides of a bracket 29 which extends upwardly from arm 16. It will now be understood that the transmission arm 16 is free to move in a direction parallel with the path of the carriage A, and that the shocks due to the reversal of the movements of the carriage are cushioned by the springs 28, and also by the friction elements 23 and 24 which engage said arm 16.

The means for shifting the transmission arm 16 comprises a bell crank lever 30 (Figs. VI and VII) pivotally connected at 31 to the carriage A, and connected to the arm 16 by means of a link 32. The bell crank lever 30 has a long arm provided with a downwardly extending pin 33 adapted to engage abutment sleeves 34 and 35, the latter being slidably mounted on a stationary rod 36 (Figs. I and VI). Springs 37, mounted on the stationary rod 36, lie between the abutment sleeves and set collars 38, the latter being adjustably secured to the rod 36. A retaining lever 39 (Figs. I, VI and VII) is provided with a pair of fingers 40 adapted to lie at opposite sides of a portion of the bell crank lever 30, as shown most clearly in Fig. VI, so as to retain said bell crank in a neutral position, thereby retaining the transmission teeth 17 and 18 in neutral positions wherein they are disengaged from the link belt 7. The retaining lever 39 is pivotally connected to the carriage at 41 and it may be shifted away from the stop 42 (Fig. VI) to release the bell crank 30 from the fingers 40, and during such movement a yieldable dog 43 carried by the lever 39 will strike a projection 44 on the short arm of the bell crank 30 with the result of positively shifting the bell crank to engage the transmission tooth 17 with the link belt 7. The supporting carriage A will then move to the right until the downwardly extending member 33 on the long arm of bell crank 30 engages the yieldable abutment sleeve 35, whereupon the bell crank, connecting bar 32 and transmission arm 16 will be actuated to disengage the tooth 17 from the link belt and to engage the tooth 18 with the opposite strand of said belt. The carriage will then move in the opposite direction until the projection 33 on the bell crank engages the abutment sleeve 34, at which time the bell crank will be shifted to reverse the movement by disengaging the tooth 18 and engaging the tooth 17 with the link belt. When the bell crank 30 is moved from one of its extreme positions to a point beyond its neutral position, it will be thrown quickly to its other extreme position, by means of a spring 45 (Fig. VI) surrounding a rod 47, the latter being pivotally connected to the carriage at 48 and slidably fitted to the swivel 49 near the free end of the bell crank.

The work holding carriage B, arranged above the supporting carriage A, is provided with wheels 50 which rest upon the tracks 6, said tracks being secured to the supporting carriage A. The frame of the work holding carriage B includes a front bar 51, a rear bar 52, and side bars 53 connecting said front and rear bars. The wheels 50 of this carriage are secured to the side bars 53. The frame of carriage B also includes an intermediate bar 54 (Fig. II) connecting the bars 51 and 52. The work holding carriage B is also provided with a platform 55 (Figs. I and IV) adapted to receive the work W. The work I have shown has a flat upper surface adapted to be engaged by a grinding or polishing wheel 56 (Fig. I). Work retaining bars 57 (Figs. I and II) loosely secured to brackets 58 which extend upwardly from the lower carriage A, rest upon the work W at opposite sides of a grinding or polishing wheel 56.

When the machine is in operation the supporting carriage A reciprocates on the tracks 1, and the work holding carriage B advances step by step in a path at a right angle to the path of the carriage A. The work holding carriage advances one step at the end of each stroke of the carriage A, as will be hereinafter described, so as to expose the entire upper surface of the work to the action of the grinding or polishing wheel 56. The work holding bars 57, which rest upon the work, lie parallel with the path of the supporting carriage A, and they are rotatably mounted in the brackets on said carriage so that they will turn freely in response to the transverse movements of the work holding carriage B, without changing the relative positions of said bars 57 and the grinding or polishing wheel 56. The axis of the grinding or polishing wheel lies parallel with the tracks of the upper carriage B and at a right angle to the tracks of the supporting carriage A.

The means for actuating the work holding carriage B includes an endless link belt 59 (Figs. I, II, III and IV) carried by the supporting carriage A, said belt being fitted to an idle wheel 60 and a drive wheel 61, both of which are rotatably secured to the carriage A.

The means for transmitting movement from the belt 59 to the work holding carriage A, includes a transmission arm 62 (Figs. II and III) pivotally connected to the carriage B at 63, and provided with a head 64 having a pair of teeth 65 and 66 which lie at opposite sides of the link belt 59. It will be apparent that the transmission arm 62 may occupy the neutral position shown in Fig. II, and that it may be shifted to interlock one of the teeth 65 and 66 with the link belt 59. The work holding carriage advances step by step in response to corresponding movements of the belt 59, and when said carriage reaches a predetermined position, the teeth 65 and 66 are shifted to reverse the movement of the carriage. The means for shifting the transmission elements 62, 64, 65 and 66, includes a bell crank lever F, pivoted at 67 to the carriage B, and connected to the arm 62 by means of a connecting bar 68. An operating handle 69 (Figs. II, IV and V) loosely secured to the bell crank F, may be actuated by hand for the purpose of stopping or reversing the movement of the carriage B, and the transmission elements of said carriage may be retained in their neutral position (Fig. II) by retaining the operating handle 69 in the position shown in Fig. II. The operating handle 69 may be lifted and retained in its neutral position by means of lugs 70, shown most clearly in Figs. IV and V. This operating lever is loosely secured to the bell crank so that it may be readily lifted to a point directly above one of the lugs 70. When the machine is in operation the operating lever 69 is located entirely below the plane of lugs 70, the bell crank F being shifted automatically, as will be presently described.

71 designates a long rod fixed to the lower carriage or supporting carriage A (Figs. I, II and IV), and provided with a pair of yieldable abutment sleeves 72 which lie in the path of a pin 73 depending from the bell crank F. The abutment sleeves 72 are slidably mounted on the rod 71 and yieldingly held in the positions shown by springs 74 (Fig. II) which engage adjustable set collars 75. When the pin 73 on the bell crank F engages one of the yielding abutment sleeves 72, the bell crank turns on the axis of its pivot 67 to release one of the teeth 65—66 from the link belt 59, and to engage the other tooth with said belt, thus reversing the movement of the carriage B.

When the bell crank F is shifted from one of its extreme positions to a point beyond its neutral position, it is thrown quickly to the other extreme position by means of a spring 76 (Figs. II and IV) surrounding a rod 77, the latter being pivoted at 78 to the carriage B and slidably fitted to a swivel 79 near one end of the bell crank F.

The link belt 59 is driven through the medium of a ratchet wheel 80 (Figs. II and III) fixed to the sprocket wheel 61, and an oscillatory pawl carrier K which surrounds a boss 81 at the axis of the ratchet wheel 80. A pawl 82 on the pawl carrier K, engages the teeth of the ratchet wheel 80. 83 designates a spring (Fig. II) tending to retain the pawl carrier in engagement with a stop lug 84. 85 designates a retaining pawl fitted to the ratchet wheel to prevent retrograde movement. The pawl carrier K has two arms, designated 86 and 87, which lie at opposite sides of the axis of the pawl carrier. A pin 88 depending from the arm 86, is adapted to engage a yieldable abutment sleeve 89, the pin 90 depending from arm 87 being adapted to engage a similar abutment sleeve 91. The rods 92 and 93, supporting the yieldable abutment sleeves 89 and 91, respectively, are secured to stationary parts of the machine at points near one of the tracks 1 of the lower carriage, or supporting carriage A. The ratchet wheel 80 and pawl carrier K are carried by the last mentioned carriage, and when said carriage completes one of the strokes of its reciprocating movement, one of the pins 88 or 90 strikes one of the abutment sleeves 89 or 91, and the pawl carrier K is then shifted so as to advance the ratchet wheel 80 and link belt 59. The operative movement of the pawl carrier K is limited by an adjustable stop pin 94 (Figs. II and III) adapted to be inserted into any one of the holes 95. It will now be understood that the work holding carriage B advances one step in response to each stroke of the supporting carriage A, and that the movement of the work holding carriage is automatically reversed when it reaches predetermined positions.

The grinding or polishing wheel 56 (Fig. I) is rotatably secured to the free end of an arm 96, the latter being pivoted at 97. A pulley 98, shown by dotted lines in Fig. I, is secured to the wheel 56. The driving mechanism comprises a belt 99 fitted to the pulley 98 and also to the larger pulley 100, a pulley 101 secured to the pulley 100, and a belt 102 for transmitting movement from a drive pulley 103. The weight of the grinding or polishing wheel 56 is preferably counterbalanced by a lever 104 pivotally supported at 105 and connected at one end to the arm 96, as shown in Fig. I.

I claim:—

1. A machine having an endless belt, means for moving said belt continuously in an endless path, a carriage operable by said belt, a reversing device including a yieldable device for engaging said endless belt to impart a reciprocating movement to said carriage, said yieldable device being movable in opposite directions parallel with the path of the reciprocating carriage, said belt being arranged to form two oppositely moving strands which travel continuously in opposite directions and said yieldable device being adapted to engage either strand of the belt, and yieldable operating means for oscillating said yieldable device to force it into engagement with said belt.

2. A machine having a reversing device including an endless power transmission belt, a traveling reversing element adapted to be engaged with and disengaged from either rim of said power transmission belt to provide for the reversal of the movement, and a shock absorbing device including friction elements and an elastic cushion associated with said reversing element to gradually cushion the shocks to which the latter is subjected.

3. A machine having an endless belt, means for moving said belt continuously in an endless path, a carriage operable by said belt, and a reversing device for engaging said belt to impart a reciprocating movement to said carriage, said reversing device including an oscillating member adapted to occupy a neutral position to release the carriage from the endless belt, and means for forcing said oscillating member from its neutral position to its operative position wherein it engages said belt to provide for the transmission of power to said carriage.

4. A machine having an endless belt, means for moving said endless belt continuously in an endless path, a carriage operable by said belt, said endless belt being arranged to form two belt strands which travel in opposite directions, and a reversing device including a power transmission device and means for moving said power transmission device into and out of engagement with the oppositely moving strands to impart a reciprocating movement to said carriage.

5. A machine having an endless belt, means for moving said endless belt continuously in an endless path, said endless belt being arranged to form two belt strands which travel in opposite directions, a carriage operable by said belt, and a reversing device including a pair of transmission members each of which is adapted to engage one of said strands, and means for shifting said transmission members into and out of engagement with said strands to impart a reciprocating movement to said carriage.

6. A machine having an endless belt, means for moving said endless belt continuously in an endless path, said endless belt being arranged to form two belt strands which travel in opposite directions, a carriage operable by said belt and a reversing device including a pair of teeth each of which is adapted to interlock with one of said strands and operating means for releasing one of said teeth from one of the strands and thereafter interlocking the other tooth with the other strand to provide for the reversal of the movement of said carriage.

7. A machine having an endless belt, means for moving said endless belt continuously in an endless path, said endless belt being arranged to form two belt strands which travel in opposite directions, a carriage operable by said belt and a reversing device including a pair of teeth each of which is adapted to interlock with one of said strands and operating means for releasing one of said teeth from one of the strands and thereafter interlocking the other tooth with the other strand to provide for the reversal of the movement of said carriage, and a belt retaining device located adjacent to said teeth so as to allow the teeth to be withdrawn from the belt.

8. A machine having an endless belt, means for moving said endless belt continuously in an endless path, said endless belt being arranged to form two belt strands which travel in opposite directions, a carriage operable by said belt, a reversing device including a pair of teeth each of which is adapted to interlock with one of said strands and operating means for releasing one of said teeth from one of the strands and thereafter interlocking the other tooth with the other strand to provide for the reversal of the movement of said carriage, and a belt retaining device located adjacent to said teeth so as to allow the teeth to be withdrawn from the belt, said teeth being movable transversely of the path of the belt and said belt retaining device being located in a fixed position with respect to the path of the belt.

9. A machine having an endless belt, means for moving said endless belt continuously in an endless path, said endless belt being arranged to form two belt strands which travel continuously in opposite directions, a carriage, means for transmitting movement from said endless belt to said carriage so as to impart a reciprocating movement to the carriage, said means including a power transmission device adapted to engage either of the strands of the endless belt to provide for the movement of the carriage in opposite directions, and means for retaining said power transmission device in a neutral or inoperative position wherein it is out of operative engagement with both of the strands of said endless belt.

10. A machine of the character described having a supporting carriage, a work holding carriage supported thereby, the track of one carriage being at an angle to the track of the other carriage, a finishing device adapted to engage the work carried by said work holding carriage, and operating devices including means for reciprocating the supporting carriage continuously, and an intermittent feeder for advancing the work holding carriage step by step, said intermittent feeder being operable in response to movements of said supporting carriage, and means for automatically reversing the direction of movement of said work holding carriage.

11. A machine of the character described having a carriage, an endless drive belt, means for moving said endless belt continuously, said endless belt being arranged to form two belt strands which travel constantly in opposite directions, and a reversing device for engaging said belt strands to impart a reciprocating movement to said carriage, said reversing device including a toothed device having two teeth each of which is adapted to engage one of said belt strands, an oscillatory lever for actuating said toothed device, said lever and toothed device being carried by said carriage, and a pair of yieldable abutments arranged in the path of a portion of said lever and supported independently of said carriage.

12. A machine of the character described having a carriage, an endless drive belt for actuating said carriage, and a belt driving device comprising a drive wheel fitted to said belt, a ratchet wheel for operating said drive wheel, an oscillatory pawl carrier provided with a pawl adapted to engage said ratchet wheel, a second carriage supporting said drive wheel, ratchet wheel, pawl carrier and endless drive belt, said pawl carrier having abutments at opposite sides of its axis, and a pair of abutments supported independently of said carriages, each of the last mentioned abutments being in the path of one of the first mentioned abutments.

13. A machine of the character described having a work holding carriage, a finishing device adapted to engage the work, and rotatable work retaining bars extending across said carriage and adapted to rest upon the work, said work retaining bars being cylindrical and a support, independent of said carriage, for retaining said bars in their operative positions.

14. A machine of the character described having a work holding carriage, a finishing device adapted to engage the work, and cylindrical work retaining bars extending across said carriage and adapted to rest upon the work, and a support, independent of said carriage, for retaining said bars in their operative positions, said finishing device being arranged to engage the work at points between the work retaining bars and said support being provided with bearings in which the work retaining bars are rotatably mounted.

15. A machine having an endless belt, means for moving said endless belt continuously in an endless path, said endless belt being arranged to form two belt strands which travel in opposite directions, a reversible carriage operable by said belt, a power transmission device adapted to engage either of the oppositely moving belt strands to transmit movement from said belt to said reversible carriage, and means for shifting said power transmission device from one of said belt strands to the other to provide for the reversal of said carriage, said means including abutments adjustable to different positions to vary the strokes of said reversible carriage.

16. A machine having an endless belt, means for moving said endless belt continuously in an endless path, said endless belt being arranged to form two belt strands which travel in opposite directions, a reversible carriage operable by said belt, a power transmission device adapted to engage either of the oppositely moving belt strands to transmit movement from said belt to said reversible carriage, and means for shifting said power transmission device from one of said belt strands to the other to provide for the reversal of said carriage, said means including yieldable abutments and a shifting device adapted to engage said yieldable abutments.

17. A machine having an endless belt, means for moving said endless belt continuously in an endless path, said endless belt being arranged to form two belt strands which travel in opposite directions, a reversible carriage operable by said belt, a power transmission device adapted to engage either of the oppositely moving belt strands to transmit movement from said belt to said reversible carriage, and means for shifting said power transmission device from one of said belt strands to the other to provide for the reversal of said carriage, said means including a shifting device movable from one extreme position to another so as to shift the power transmission device from one of said belt strands to the other, and a spring adapted to actuate said shifting device when the latter approaches either of its extreme positions.

THEODORE F. PHILIPPI.